US006956342B1

(12) United States Patent
Fang

(10) Patent No.: US 6,956,342 B1
(45) Date of Patent: Oct. 18, 2005

(54) DRIVING CIRCUIT FOR A DC BRUSHLESS FAN MOTOR

(75) Inventor: Jun-Ming Fang, Hsin-Chuang (TW)

(73) Assignee: Datech Technology Co., Ltd., Taipei Hsien (TW)

( * ) Notice: Subject to any disclaimer, the term of this patent is extended or adjusted under 35 U.S.C. 154(b) by 0 days.

(21) Appl. No.: 10/834,927

(22) Filed: Apr. 30, 2004

(51) Int. Cl.[7] .................................................. H02P 3/08
(52) U.S. Cl. ...................... 318/254; 318/439; 318/138; 318/459; 388/928.1; 388/923
(58) Field of Search ................................ 318/254, 138, 318/439, 500, 459; 388/800, 928.1, 809, 388/923

(56) References Cited

U.S. PATENT DOCUMENTS 5,764,020 A * 6/1998 Maiocchi .................... 318/705
5,969,491 A * 10/1999 Viti et al. ................... 318/254
6,081,091 A * 6/2000 Mitchell et al. ............ 318/685
6,236,175 B1 * 5/2001 Mourad et al. ............. 318/268
6,528,967 B2 * 3/2003 Hallidy ....................... 318/808
6,686,714 B2 * 2/2004 Trifilo ........................ 318/439

* cited by examiner

*Primary Examiner*—Rina Duda
(74) *Attorney, Agent, or Firm*—Troxell Law Office, PLLC

(57) ABSTRACT

The present invention is a driving circuit for a DC brushless fan motor, comprising a control unit, a motor, a Hall element, a signal output unit, a temperature control circuit, a reverse protection circuit and a counter-electromotive force (CEMF) removal circuit, as tied in with a plurality of resistors, capacitors, diodes and transistors. Accordingly, the ambient temperature is sensed by the temperature control circuit and is fed back to control the rotation rate of the motor.

8 Claims, 4 Drawing Sheets

* CEMF: counter-electromotive force

* CC: Constant Current

DRIVING CIRCUIT FOR A DC BRUSHLESS FAN MOTOR

FIELD OF INVENTION

The present invention relates to a driving circuit for a DC brushless fan motor; more particularly, relates to a temperature sensor to sense the ambient temperature and feed it back to the motor to control its rotation rate.

DESCRIPTION OF PRIOR ART

As is known, a motor control circuit of the prior art (as shown in FIG. 4) comprises a control unit G, wherein the first and the second pin is connected with a Hall element A. The sixth pin is connected with the ninth pin through a motor B. The motor B is connected with a diode D. The diode D is connected with a first resistor E and the fourteenth pin. The fourteenth pin is connected with a second resistor F. And the second resistor F is connected with the Hall element A. Accordingly, a motor control circuit is constructed.

Although the motor control circuit can control the on and off of the motor B, it is only a simple control circuit comprising a diode, a first resistor, the fourteenth pin of the control unit and the motor. So, if the ambient temperature of the motor B is too high, the control circuit may not be able to respond accordingly and the control unit G may receive the overheating signal of the motor B and it may result in thermal shutdown.

BRIEF DESCRIPTION OF INVENTION

Therefore, the main purpose of the present invention is to sense the ambient temperature by the temperature sensor and a proper current is fed back to control the rotation rate of the motor.

To achieve the above purpose, the present invention is a driving circuit for a DC brushless fan motor, comprising a control unit, a motor, a Hall element, a signal output unit, a temperature control circuit, a reverse protection circuit and a counter-electromotive force (CEMF) removal circuit, wherein an LB1868M chip is taken as a preferred embodiment for the control unit according to the present invention, which is by no means for any limitation. The control unit of the present invention can be made by way of System on Chip (SOC), Single Chip or Hardware Script Language (HSL).

Accordingly, the ambient temperature is sensed by the temperature sensor and is fed back to the system that a proper current is offered to control the rotation rate of the motor.

BRIEF DESCRIPTION OF THE DRAWINGS

The present invention will be better understood from the following detailed description of preferred embodiment of the invention, taken in conjunction with the accompanying drawings, in which.

DESCRIPTION OF PREFERRED EMBODIMENT

The following descriptions of the preferred embodiment are provided to understand the features and the structures of the present invention.

Figure 1:
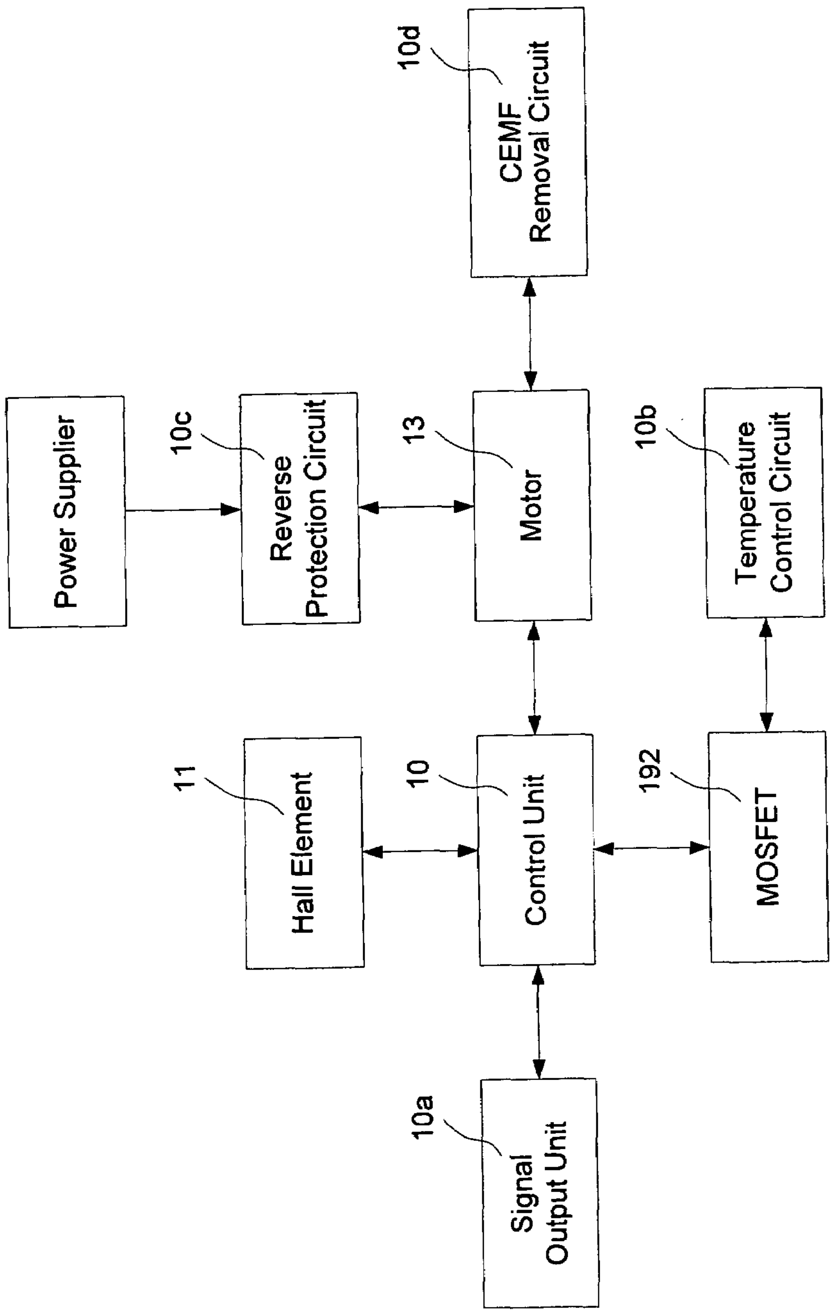
FIG. 1 is a block diagram showing the architecture according to the present invention.
Figure 2:
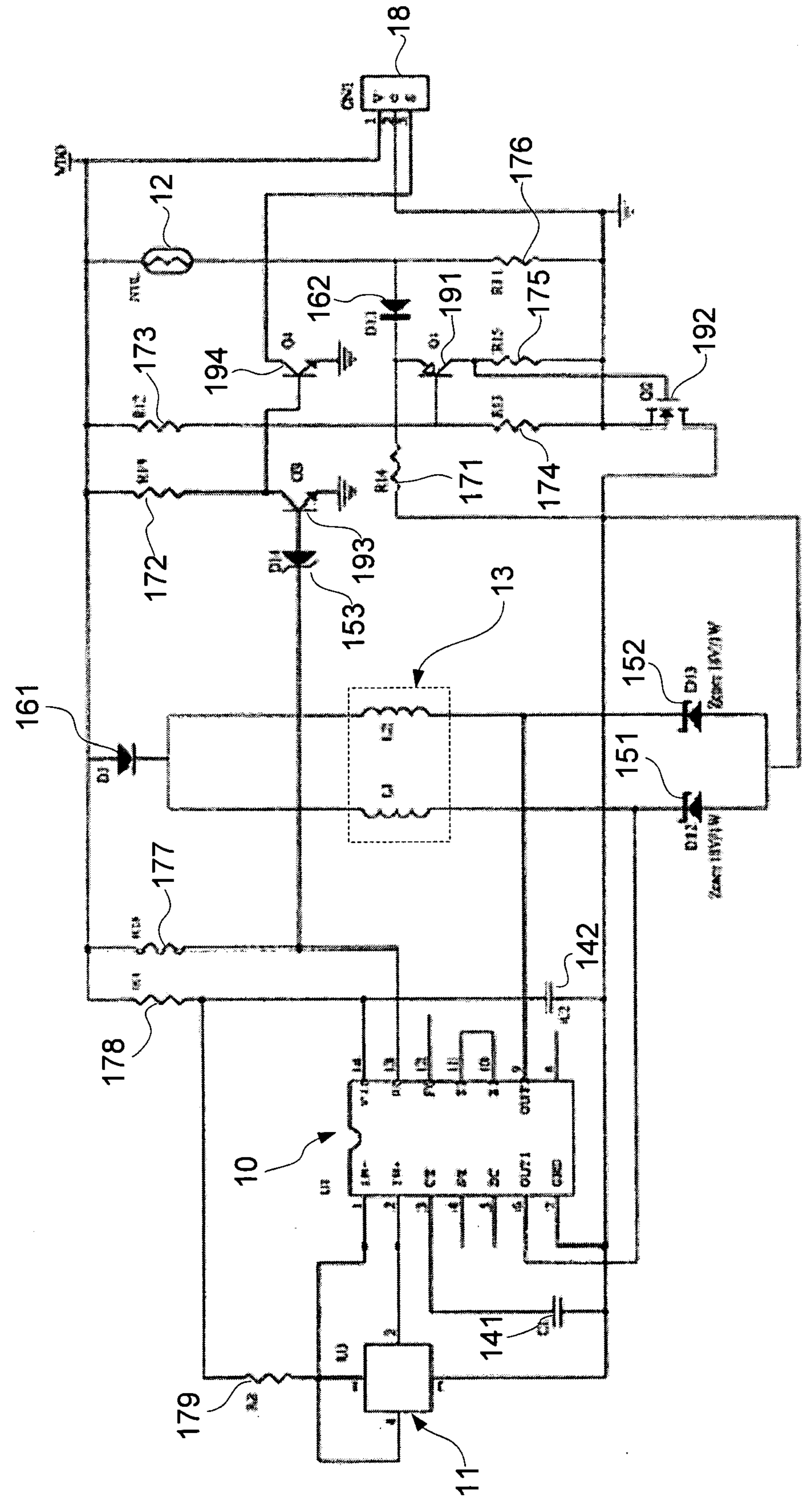
FIG. 2 is a circuit diagram showing the architecture according to the present invention.
Figure 3:
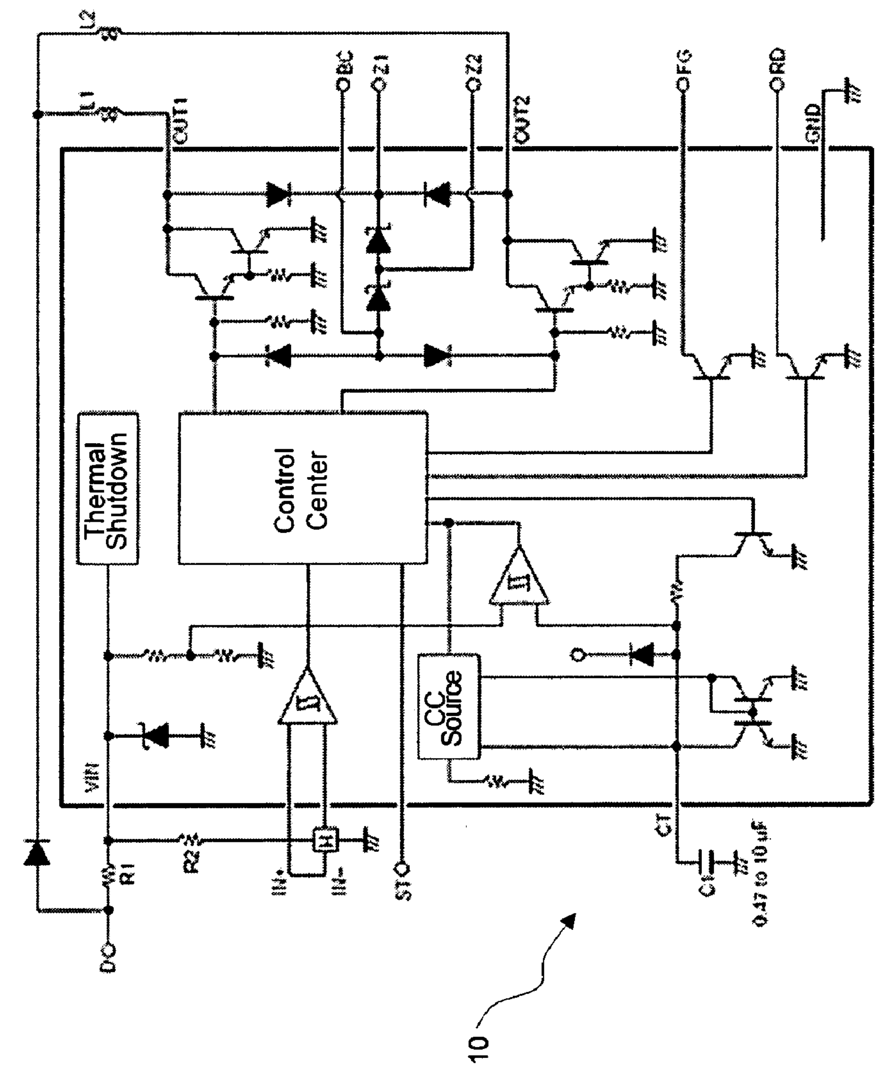
FIG. 3 is a circuit diagram of the control unit according to the present invention.
Figure 4:
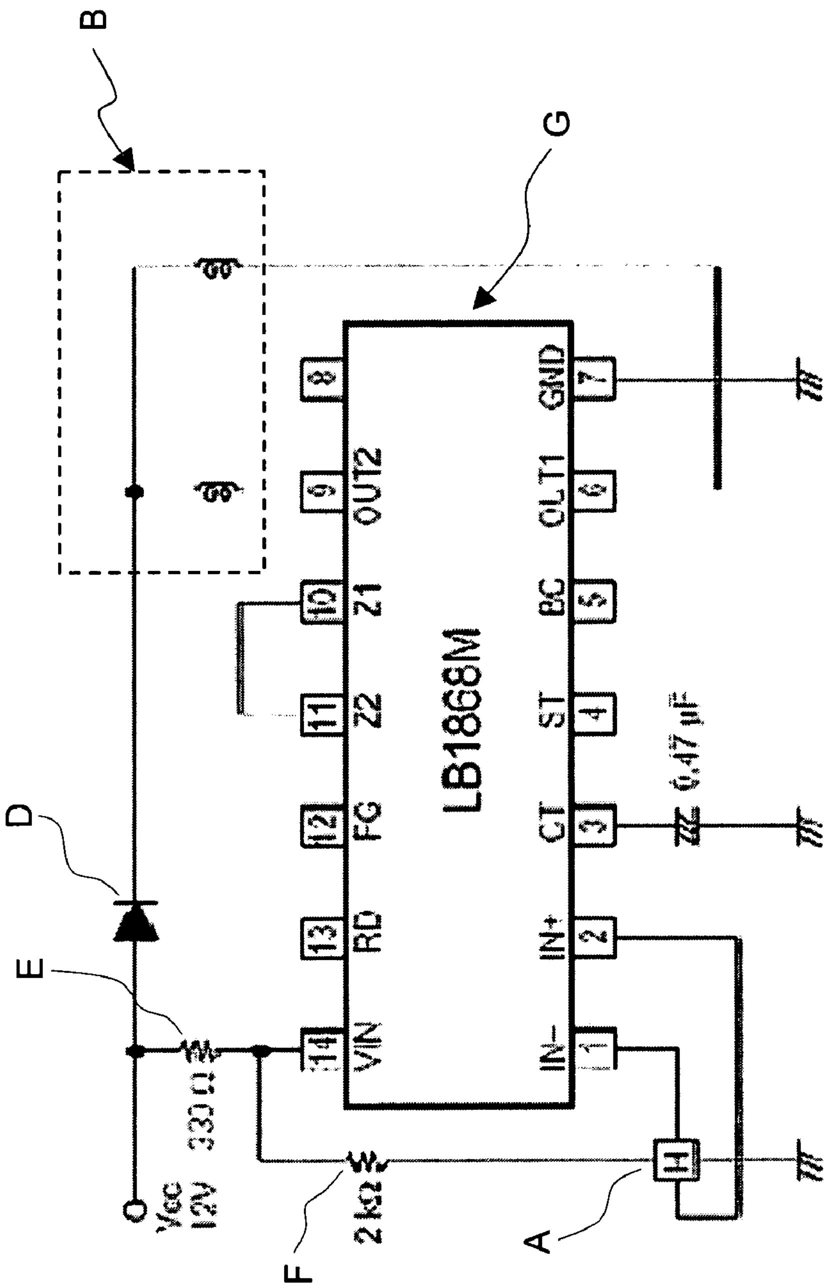
FIG. 4 is a circuit diagram showing the control of a DC brushless fan motor according to the prior art.

Please refer to FIG. 1 till FIG. 3, which are a control circuit diagram, a circuit diagram of the control circuit and a circuit diagram of the control unit, according to the present invention. As shown in the figures, the present invention is a driving circuit for a DC brushless fan motor, comprising a control unit 10, a motor 13, a Hall element 11, a signal output unit 10*a*, a temperature control circuit 10*b*, a reverse protection circuit 10*c*, a counter-electromotive force (CEMF) removal circuit 10*d*, and a connector 18, as tied in with a plurality of transistors, diodes, resistors and capacitors. Thereby, through sensing the running temperature of the motor 13 by a temperature sensor 12 and feeding it back to the motor 13, an adequate current is offered as tied in with a current limiting resistor to control the rotation rate of the motor and the ambient temperature.

The control unit 10 can be an LB1868M chip or a single chip with similar function, which is the processing center of the control circuit. The motor is connected with the control unit 10. The Hall element 11 is connected with the control unit 10 to detect the position of the motor rotor. The signal output unit 10*a* is connected with the control unit 10 to notify the outside (such as a computer) whether the motor 13 is running. The temperature control circuit 10*b* is connected with the control unit 10 to adjust the rotation rate of the motor 13 according to different ambient temperatures as tied in with the connected second transistor 192 (MOSFET). The reverse protection circuit 10*c* is connected with the motor 13 to avoid reverse voltage feedback. The counter-electromotive force (CEMF) removal circuit 10*d* is connected with the control unit 10 to prevent other components from damage owing to the transient CEMF made by the motor 13.

Concerning the control circuit according to the present invention, the first pin (IN−) of the control unit 10 is connected with the fourth pin (IN−) of the Hall element 11. The Hall element 11 is to detect the position of the rotor of the motor 13. The second pin (IN+) of the control unit 10 is connected with the second pin (IN+) of the Hall element. The third pin (CT) of the control unit 10 is connected with a first capacitor 141 and the third pin of the Hall element 11.

The sixth pin (OUT1) of the control unit is connected with a first and a second Zener diodes 151, 152 to form a CEMF removal circuit 10*d*. The first and the second Zener diodes 151, 152 are connected with the motor 13 and the motor 13 is connected with a first diode 161, where a reverse protection circuit 10*c* is obtained. The second resistor 172 is connected with the collector of a third transistor 193. The emitter of the third transistor 193 is grounded. The base of the third transistor is connected with a third Zener diode 153. The collector of the third transistor 193 is connected with the second resistor through the base of a fourth transistor. The emitter of the fourth transistor is grounded. The collector of the fourth transistor 194 is connected with the third pin of the connector 18 to form a signal output unit 10*a*. The first and the second Zener diodes 151, 152 are connected with a first resistor 171. The first resistor 171 is connected with the emitter of a first transistor 191. The emitter of the first transistor 191 is connected with a second diode 162. Through the second diode 162, the temperature control circuit 10*b* is connected with the temperature sensor 12 and the third resistor 173. The base of the first transistor 191 is connected with a fourth resistor 174 and the second transistor 192. The collector of the first transistor 191 is connected with the second transistor 192 and a fifth and a sixth resistors 175, 176. The fifth and the sixth resistors 175, 176 are connected with the second pin of the connector 18 and are grounded. The sixth resister 176 is connected with the second diode 162.

The seventh pin (GND) of the control unit is connected with a first capacitor 141, the third pin of the Hall element 11 and the second transistor 192 (MOSFET). The seventh pin is connected with the second transistor 192 through a second capacitor 142. The second capacitor is connected with an eighth and a ninth resistor 178, 179. The ninth resistor 179 is connected with the first pin of the Hall element 11. The ninth pin (OUT2) of the control unit is connected with the motor 13. The tenth pin (Z1) of the control unit 10 is connected with the eleventh one (Z2). The thirteenth pin (RD) of the control unit 10 is connected with a seventh resistor 177. The seventh resistor 177 is connected with a first diode 161, a second and a third resistors 172, 173 and the temperature sensor 12, and is connected with the first pin of the connector 18. Through the fourteenth pin (VIN) of the control unit 10, the second capacitor 142 is connected with the eighth resistor 178.

The thirteenth pin (RD) of the control unit 10 is also connected with the signal output unit 10*a* to notify the outside (such as a computer) whether the motor 13 is running. Take the LB1868M chip in the control unit 10 as an example. The RD is about 12v when the motor 13 stops; 0v, when it is running; and, 5~6v, when it is running in low rotation rate. If this part of circuit is omitted, the outside equipment may misapprehend the motor as not running. So, the signal output unit 10*a* is added in the present invention to solve the problem.

By using the LB1868M chip of the control unit 10 according to the present invention, as tied in with the second transistor 192 (MOSFET) and the temperature sensor 12 and the temperature control circuit 10*b*, the rotation rate of the motor can be adjusted according to different ambient temperatures. The MOSFET is an n-channel enhanced MOSFET, which is normally off. When $V_{GS}$ is equal to 0V, in order to gain drain current, the gate voltage must be over the threshold voltage. The temperature sensor with negative temperature coefficient (NTC) is used in the present invention, as tied in with the temperature control circuit, to adjust the bias voltage of the MOSFET, and to further control the drain voltage degree so that the rotation rate of the motor can be under control. By doing so, the ambient temperature of the motor is sensed and the rotation rate is further under control to keep the ambient temperature. Accordingly, by the above circuit components, a driving circuit for a DC brushless fan motor is constructed. When the power is on, a signal is immediately sent to the control unit 10 and the control unit 10 is booted up to produce half-wave control signals to control the motor 13. When the motor is running, by the Hall element 11 and the temperature sensor 12, the running status of the motor is sensed and adjusted to keep the ambient temperature, wherein the motor is under control more efficiently by the combination of the above circuit components. And, the above circuit components can have further series or parallel connections with some basic circuit components (such as capacitors, resistors, diodes, transistors) to improve actual applications to meet special requests (such as matching).

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A driving circuit for a DC brushless fan motor, comprising:

a control unit as a processing center;

a motor connected with said control unit;

a Hall element connected with said control unit to detect the position of the rotor of said motor;

a signal output unit connected with said control unit to notify the outside whether said motor is running;

a temperature control circuit connected with said control unit to adjust the rotation rate of said motor according to different ambient temperatures as tied in with a transistor (MOSFET) connected;

a reverse protection circuit connected with said motor to avoid reverse voltage feedback; and a counter-electromotive force (CEMF) removal circuit connected with said control unit to prevent other components from damage owing to a transient CEMF made by said motor.

2. The driving circuit according to claim 1, wherein said control unit is an LB1868M chip.

3. The driving circuit according to claim 1, wherein a first pin (IN−) of said control unit is connected with a fourth pin (IN−) of said Hall element, and a second pin (IN+) of said control unit is connected with a second pin (IN+) of said Hall element, and a third pin (CT) of said control unit is connected with a first capacitor and a third pin of said Hall element, and a first pin of the hall element is connected to a resistor.

4. The driving circuit according to claim 1, wherein a pin (OUT1) of said control unit is connected with a first and a second Zener diodes to obtain a CEMF removal circuit, and said first and said second Zener diodes are connected with the motor, and said motor is connected with a first diode to obtain a reverse protection circuit, and said first diode is connected with a second and a third resistors, and said second resistor is connected with the collector of a third transistor, and the emitter of said third transistor is grounded, and the base of said third transistor is connected with a third Zener diode, and the collector of said third transistor is connected with said second resistor and a base of a fourth transistor, and the emitter of said fourth transistor is grounded, and the collector of said fourth transistor is connected with the third pin of a connector to obtain a signal output unit, and said first and said second Zener diodes are connected with a first resistor, and said first resistor is connected with the emitter of a first transistor, and said first resistor is connected with the emitter of said first transistor, and the emitter of said first transistor is connected with a second diode;

wherein said temperature control circuit is obtained according to that: said second diode is connected with a temperature sensor, and said temperature sensor is connected with said third resistor, and the base of said first transistor is connected with a fourth resistor and a second transistor, and the collector of said first transistor is connected with said second transistor, and the collector of said first transistor is connected with a fifth and a sixth resistors, and said fifth and said sixth resistors are connected with the second pin of said connector and is grounded, and said sixth resister is connected with said second diode.

5. The driving circuit according to claim 1, wherein a pin (GND) of said control unit is connected with a second capacitor, said second transistor, and a first capacitor which is connected to a pin of said Hall element; and wherein said second capacitor is connected with a first and a second resistor, and said second resistor is connected with a first pin of said Hall element, and a pin (OUT2) of said control unit is connected with said motor.

6. The driving circuit according to claim 1, wherein a pin (Z1) of said control unit is connected with a pin (Z2) of said control unit.

7. The driving circuit according to claim 1, wherein a pin (RD) of the control unit is connected with a first resistor, and said first resistor is connected with a first diode, a second and a third resistors, a temperature sensor and a first pin of a connector.

8. The driving circuit according to claim 1, further comprising a capacitor is connected with a resistor and a pin (VIN) of said control unit.

* * * * *